United States Patent
Ogawa

(10) Patent No.: US 11,582,381 B2
(45) Date of Patent: Feb. 14, 2023

(54) METHOD OF PROVIDING CONTENTS REGARDING IMAGE CAPTURING TO IMAGE CAPTURE APPARATUS

(71) Applicant: CANON KABUSHIKI KAISHA, Tokyo (JP)

(72) Inventor: Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/344,320

(22) Filed: Jun. 10, 2021

(65) Prior Publication Data

US 2021/0306553 A1    Sep. 30, 2021

Related U.S. Application Data

(63) Continuation of application No. PCT/JP2019/048286, filed on Dec. 10, 2019.

(30) Foreign Application Priority Data

Dec. 25, 2018 (JP) .............................. JP2018-241724

(51) Int. Cl.
*H04N 5/232* (2006.01)
*G06V 40/16* (2022.01)

(52) U.S. Cl.
CPC ......... *H04N 5/23216* (2013.01); *G06V 40/16* (2022.01); *H04N 5/232933* (2018.08); *G06V 40/178* (2022.01)

(58) Field of Classification Search
CPC ......... H04N 5/23216; H04N 5/232933; H04N 5/23222; H04N 5/23218; G06V 40/16; G06V 40/178; G09B 1/32; G09B 21/00; G09B 19/00; G06Q 50/20
See application file for complete search history.

(56) References Cited

U.S. PATENT DOCUMENTS

| | | | | |
|---|---|---|---|---|
| 10,504,264 | B1* | 12/2019 | Koenig | G06T 11/001 |
| 2007/0132860 | A1* | 6/2007 | Prabhu | H04N 5/77 |
| | | | | 386/E5.067 |
| 2008/0200249 | A1* | 8/2008 | Kovach | G07F 17/3272 |
| | | | | 463/31 |
| 2009/0036186 | A1* | 2/2009 | Benco | G07F 17/3295 |
| | | | | 463/9 |
| 2017/0270139 | A1 | 9/2017 | Kim et al. | |
| 2018/0124317 | A1* | 5/2018 | Liu | H04N 5/23245 |
| 2019/0199908 | A1* | 6/2019 | Matsumoto | G10L 15/22 |

FOREIGN PATENT DOCUMENTS

| | | | |
|---|---|---|---|
| JP | 2001167253 | A | 6/2001 |
| JP | 2002107797 | A | 4/2002 |
| JP | 2002197456 | A | 7/2002 |

(Continued)

*Primary Examiner* — Kelly L Jerabek
(74) *Attorney, Agent, or Firm* — Canon U.S.A., Inc. IP Division

(57) ABSTRACT

A method includes providing a mission regarding image capturing to a user terminal having an image capture function, evaluating an image transmitted from the user terminal in response to the mission, and additionally providing a new mission regarding image capturing to the user terminal in a case where a level of achievement of the mission is determined to satisfy a criterion based on the evaluation.

9 Claims, 7 Drawing Sheets

(56) References Cited

FOREIGN PATENT DOCUMENTS

| | | | |
|---|---|---|---|
| JP | 2004212683 | A | 7/2004 |
| JP | 2006337495 | A | 12/2006 |
| JP | 2012070143 | A | 4/2012 |
| JP | 2014224958 | A | 12/2014 |
| JP | 2016118946 | A | 6/2016 |
| JP | 2016173864 | A | 9/2016 |
| JP | 2017138419 | A | 8/2017 |

\* cited by examiner

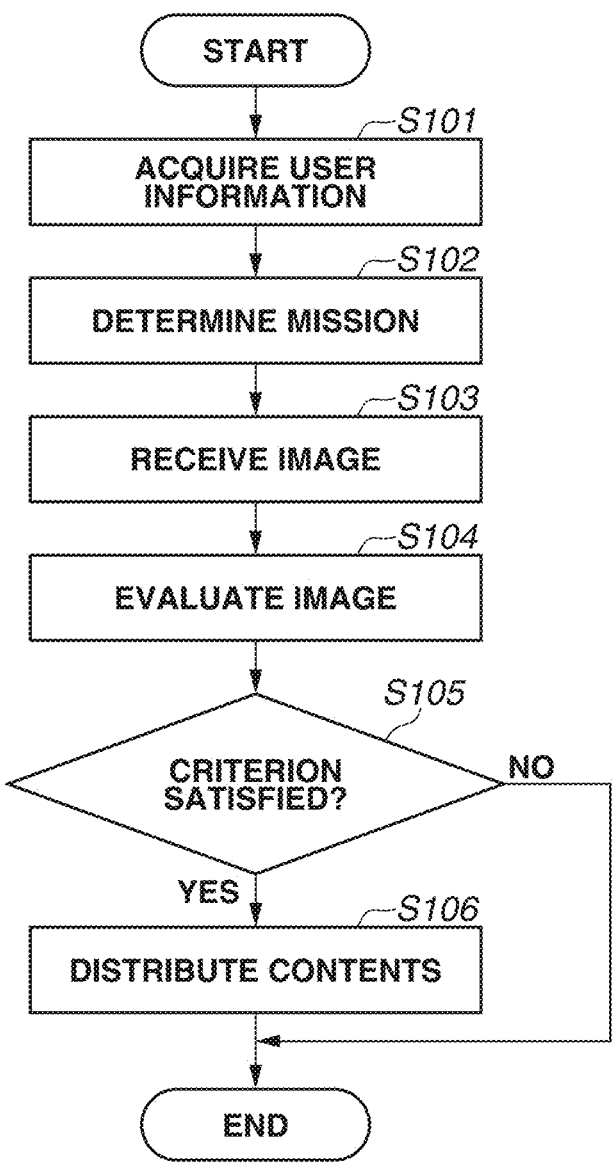

METHOD OF PROVIDING CONTENTS REGARDING IMAGE CAPTURING TO IMAGE CAPTURE APPARATUS

CROSS-REFERENCE TO RELATED APPLICATIONS

This application is a Continuation of International Patent Application No. PCT/JP2019/048286, filed Dec. 10, 2019, which claims the benefit of Japanese Patent Application No. 2018-241724, filed Dec. 25, 2018, both of which are hereby incorporated by reference herein in their entirety.

BACKGROUND

Field of the Disclosure

Aspects of the disclosure generally relate to a method of providing contents regarding image capturing to an image capture apparatus.

Description of the Related Art

A learning support system of distributing learning materials to a user terminal such as a personal computer or a tablet device has been conventionally utilized.

Japanese Patent Application Laid-Open No. 2006-337495 discusses a learning support system of providing learning materials based on a skill level and progress in learning of a user who utilizes a service in order to give a sense of achievement of learning.

However, the learning support system according to Japanese Patent Application Laid-Open No. 2006-337495 distributes the learning materials such as an English vocabulary quiz and a crossword puzzle, and the system does not distribute assignment contents (a mission or a task) that are to be accomplished by actually performing image capturing to a user terminal having an image capture function. In other words, the learning support system according to Japanese Patent Application Laid-Open No. 2006-337495 does not discuss a technique of distributing assignment contents regarding image capturing to prompt a user to perform image capturing and providing a learning opportunity through an image capture experience.

SUMMARY

According to an aspect of the embodiments, there is provided a technique of distributing contents regarding image capturing (hereinafter referred to as an image capture mission) to a user terminal having an image capture function, such as a camera, to prompt image capturing, thereby providing a user with an opportunity to enjoy the image capturing and learning through an image capture experience.

According to an aspect of the embodiments, there is provided a technique of distributing new contents based on a level of achievement of the image capture mission to maintain user's motivation for learning and help the user continue to receive distribution of the image capture mission.

According to an aspect of the embodiments, a method includes providing a mission regarding image capturing to a user terminal having an image capture function, evaluating an image transmitted from the user terminal in response to the mission, and additionally providing a new mission regarding image capturing to the user terminal in a case where a level of achievement of the mission is determined to satisfy a criterion based on the evaluation.

Further aspects of the embodiments will become apparent from the following description of exemplary embodiments.

BRIEF DESCRIPTION OF THE DRAWINGS

FIG. 3 is a flowchart illustrating control of distributing a mission according to the exemplary embodiment.

DESCRIPTION OF THE EMBODIMENTS

Exemplary embodiments, features, and aspects of the disclosure will be described below with reference to the drawings.

Exemplary embodiments described below are examples of implementing the present invention, and can be corrected or changed as appropriate depending on a configuration of an apparatus to which the present invention is applied or various kinds of conditions.

Figure 1A:
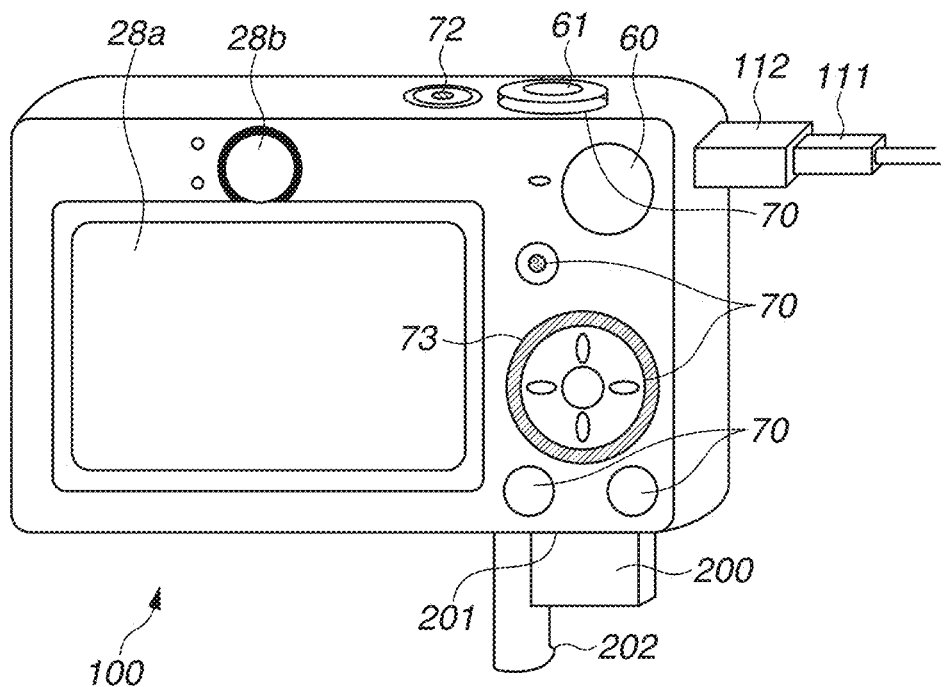
FIG. 1A is an external view of a camera according to an exemplary embodiment.
Figure 1B:
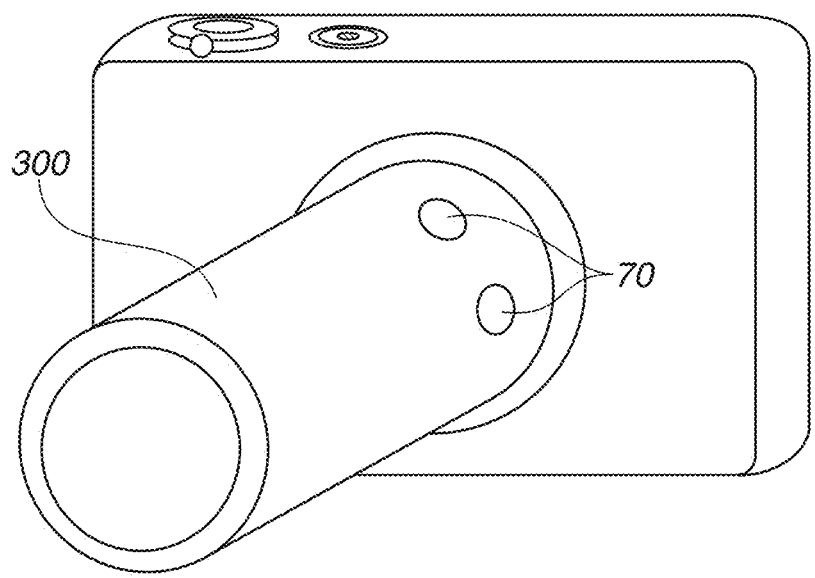
FIG. 1B is an external view of the camera according to the exemplary embodiment.

FIG. 1A is an external view of a camera according to the exemplary embodiment. FIG. 1A is an external view of the camera when viewed from a user side (from a rear surface side), and FIG. 1B is an external view of the camera when viewed from a subject side (from a front surface side).

A digital camera 100 includes a display unit 28 that displays information regarding a captured image and various kinds of settings regarding image capturing. The display unit 28 includes a rear surface display panel 28a and an electronic viewfinder 28b, and switches display based on an operation.

The camera 100 includes various operation units. A shutter button 61 arranged on a top surface of the camera 100 is an operation unit for providing an instruction for capturing an image. A mode changeover switch 60 arranged on a rear surface is an operation unit for switching an image capture mode. An operation unit 70 includes operation members that accept various kinds of operations from a user, such as various kinds of switches, buttons, and a touch panel. A controller wheel 73 among these members is an operation member that can be rotationally operated.

A power switch 72 arranged on the top surface of the camera 100 is a push button for switching on and off of power supply of the camera 100. A connection cable 111 for connecting the camera 100 to an external apparatus such as a personal computer or a printer is attached to a connector 112 arranged on a side surface of the camera 100.

A recording medium slot 201 for housing a recording medium 200 such as a memory card or a hard disk is provided on a bottom surface of the camera 100. When the recording medium 200 is housed in the recording medium slot 201, the recording medium 200 becomes communicable with the digital camera 100, so that an image can be recorded in the recording medium 200, and the image recorded in the recording medium 200 can be reproduced on the camera 100. A cover 202 is a cover for the recording medium slot 201. FIG. 1A illustrates a state in which the cover 202 is open and part of the recording medium 200 is ejected from the recording medium slot and exposed.

A lens barrel 300 is provided on the front surface side of the camera 100, and a part of the operation unit 70 is arranged on a side surface of the lens barrel 300. The camera 100 can be operated using the operation unit 70 arranged on the side surface of the lens barrel 300.

Figure 2:
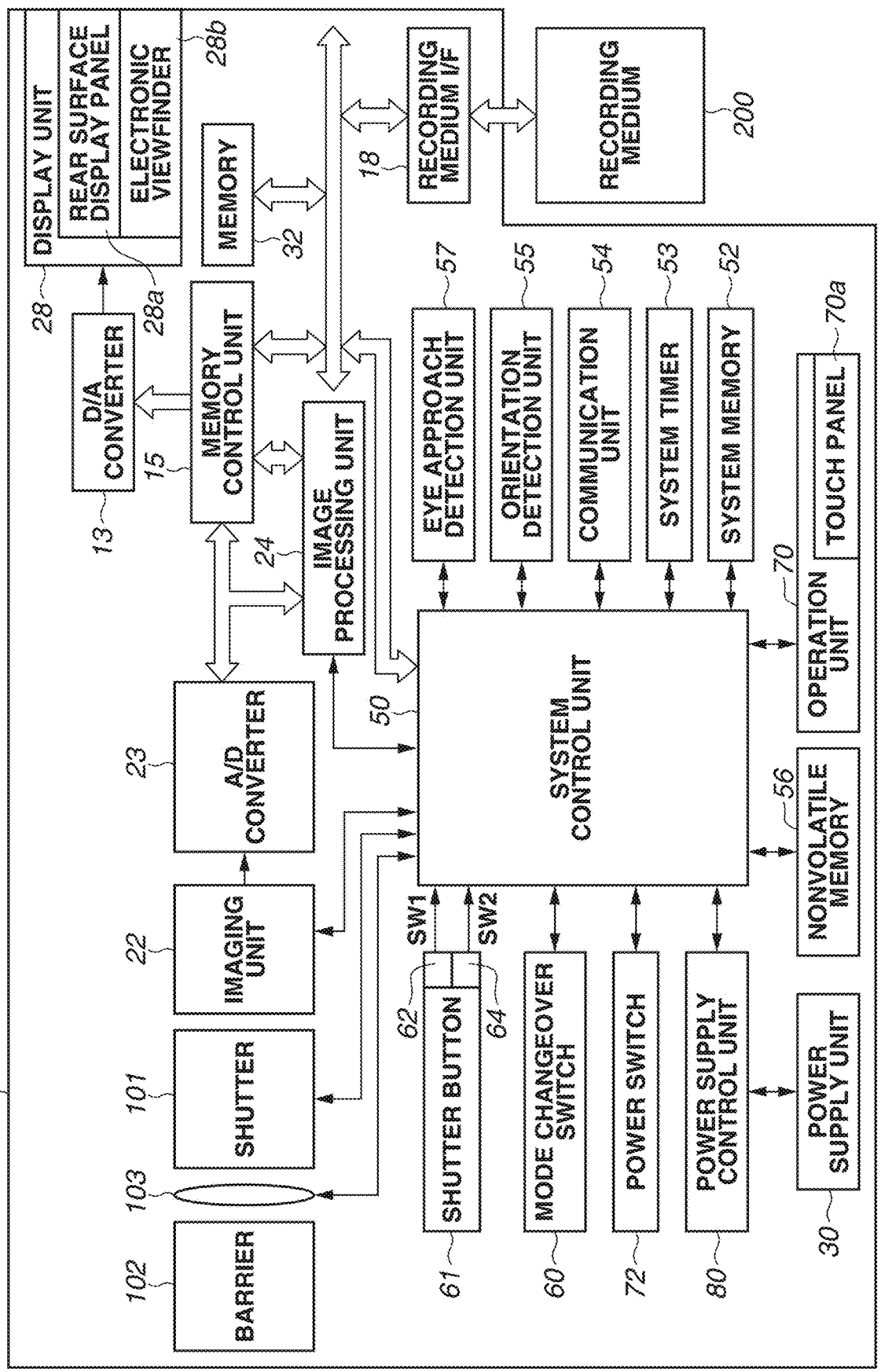
FIG. 2 is a functional block diagram illustrating a configuration of the camera according to the exemplary embodiment.

FIG. 2 is a block diagram illustrating a configuration example of the camera 100 according to the exemplary embodiment.

In FIG. 2, an imaging lens 103 is a lens group including a zoom lens and a focus lens. A shutter 101 is a shutter having an aperture function. An imaging unit 22 is an image sensor including a charge coupled device (CCD) or a complementary metal-oxide semiconductor (CMOS) device that converts an optical image into electric signals. An analog-to-digital (A/D) converter 23 converts analog signals output from the imaging unit 22 into digital signals. A barrier 102 covers an imaging system including the imaging lens 103 of the camera 100, thereby preventing members of the imaging system including the imaging lens 103, the shutter 101, and the imaging unit 22 from being contaminated or broken.

An image processing unit 24 performs a pixel interpolation, a resize process such as a size reduction, and a color conversion process on data from the A/D converter 23 and data from a memory control unit 15. In addition, the image processing unit 24 performs a predetermined computation process using image data of a captured image, and a system control unit 50 performs exposure control and distance measuring control based on an obtained computation result. As a result, an autofocus (AF) process, an autoexposure (AE) process, and an electronic flash pre-emission (EF) process using a through-the-lens (TTL) metering are performed. Furthermore, the image processing unit 24 performs the predetermined computation process using the image data of the captured image and performs an auto white balance (AWB) process using the TTL metering based on an obtained computation result.

Output data from the A/D converter 23 is written in a memory 32 via the image processing unit 24 and the memory control unit 15, or via the memory control unit 15. The memory 32 stores therein image data obtained by the imaging unit 22 and converted into digital data by the A/D converter 23, and image data to be displayed on the display unit 28. The memory 32 is provided with a memory capacity enough to store a predetermined number of still images, moving images, and audio.

The memory 32 also functions as a memory (video memory) for image display. A digital-to-analog (D/A) converter 13 converts data for image display stored in the memory 32 to analog signals and supplies the analog signals to the display unit 28. In this manner, the image data for display written in the memory 32 is displayed on the display unit 28 via the D/A converter 13. By converting the digital signals, which are converted by the A/D converter 23 and accumulated in the memory 32, into analog signals by the D/A converter 13, sequentially transferring the analog signals to the display unit 28, and displaying the analog signals on the display unit 28, a through-the-lens image (live view image) can be displayed on the display unit 28.

A nonvolatile memory 56 is a memory capable of electrically recording and erasing data, and for example, an electrically erasable programmable read only memory (EEPROM) is used as the nonvolatile memory 56. The nonvolatile memory 56 stores therein constants for operation of the system control unit 50, and programs. The programs mentioned herein includes a computer program for implementing various kinds of flowcharts, which will be described later.

The system control unit 50 controls the entire camera 100. Each process, which will be described later, will be implemented by the system control unit 50 executing the program recorded in the nonvolatile memory 56. A system memory 52 is a random access memory (RAM), and is used for loading a constant and a variable for operation of the system control unit 50 and the program or the like read from the nonvolatile memory 56. The system control unit 50 can also perform display control by controlling the memory 32, the D/A converter 13, and the display unit 28.

A system timer 53 is a timer unit that measures time used for various kinds of control and time of a built-in clock.

The mode changeover switch 60, the shutter button 61, and the operation unit 70 are operation means to input various kinds of operation instructions to the system control unit 50. Operating the mode changeover switch 60 enables switching of an operation mode of the system control unit 50 to any of a still image recording mode, a moving image recording mode, and a reproduction mode.

A first shutter switch 62 is turned on when the shutter button 61 provided on the camera 100 is pressed halfway down (an image capture preparation instruction), and then generates a first shutter switch signal SW1. In response to the first shutter switch signal SW1, the system control unit 50 starts an operation of the AF process, the AE process, the AWB process, the EF process, or the like.

A second shutter switch 64 is turned on when the shutter button 61 is pressed all the way down (an image capture instruction), and then generates a second shutter switch signal SW2. In response to the second shutter switch signal SW2, the system control unit 50 starts a series of operations of image capture process from reading signals from the imaging unit 22 to writing image data to the recording medium 200.

A power supply control unit 80 includes a battery detection circuit, a direct current to direct current (DC-DC) converter, and a switching circuit that switches a block to be energized, and the power supply control unit 80 detects whether a battery is mounted, a type of the battery, and a remaining battery level. The power supply control unit 80 controls the DC-DC converter based on a result of the detection and an instruction from the system control unit 50, and supplies a necessary voltage to various units including the recording medium 200 for a necessary period of time.

A power supply unit 30 includes a primary battery such as an alkaline battery or a lithium battery, a secondary battery such as a nickel-cadmium (NiCd) battery, a nickel-metal hydride (NiMH) battery, or a lithium (Li) battery, or an alternate current (AC) adapter. A recording medium interface (I/F) 18 is an interface to the recording medium 200. The recording medium 200 is a recording medium for recording a captured image, such as a memory card, and includes a semiconductor memory, an optical disk, a magnetic disk, or the like.

A communication unit 54 is a communication interface for communicating with an external apparatus in a wireless or wired manner, and transmits and receives moving image signals and audio signals to and from the external apparatus. The communication unit 54 can also be connected to a wireless local area network (LAN) or the Internet. The communication unit 54 can transmit an image (including a through-the-lens image) captured by the imaging unit 22 and an image recorded in the recording medium 200 to the external apparatus, and can receive image data and various kinds of information other than the image data from the external apparatus.

An orientation detection unit 55 detects an orientation of the digital camera 100 with respect to the gravitational direction. It is possible to determine whether an image captured by the imaging unit 22 is an image captured with the digital camera 100 in a landscape orientation or an image captured with the digital camera 100 in a portrait orientation, based on the orientation detected by the orientation detection unit 55. The system control unit 50 can add direction information corresponding to the orientation detected by the orientation detection unit 55 to an image file of the image captured by the imaging unit 22, and record the image in a rotated state. An acceleration sensor, a gyro sensor, or the like can be used as the orientation detection unit 55.

An eye approach detection unit 57 detects an approach of an eye of the user (object). The system control unit 50 switches display and non-display on the rear surface display panel 28a and the electronic viewfinder 28b based on a state detected by the eye approach detection unit 57.

Although not illustrated, the camera 100 may include a global positioning system (GPS) device for acquiring the position of the camera 100. Furthermore, attribute information such as a user's age may be input using the operation member described above and stored in the camera 100. Utilizing these information in distributing assignment contents to be distributed from the external apparatus such as a server apparatus, which will be described later, and in outputting a captured image enables distribution of contents appropriate for the user.

Subsequently, a "mission mode" will be described.

FIG. 3 is a flowchart of control illustrating an operation of the server apparatus in the "mission mode".

The user can utilize the "mission mode" by starting a camera application (hereinafter referred to as a camera app) installed in the camera 100 and stored in the nonvolatile memory 56. When the user starts the camera app by operating the camera 100, the camera 100 communicates with the external server apparatus. The camera 100 then receives distributed assignment contents regarding image capturing (hereinafter referred to as an image capture mission) from the server apparatus. The camera 100 can store and accumulate the received image capture mission in the nonvolatile memory 56.

The user performs image capturing in accordance with contents of the distributed image capture mission using the camera 100, and transmits a captured image obtained thereby to the server apparatus. The server apparatus evaluates the captured image transmitted by the user and determines a level of achievement of the image capture mission based on the evaluation. The server apparatus then controls additional distribution of contents to the camera 100 based on a result of the determination.

Operations of the server apparatus are as follows. First, in step S101, when the "mission mode" is started in the camera 100, the server apparatus acquires user information from the camera 100. In step S102, the server apparatus determines an image capture mission to be distributed to the camera 100 based on the acquired user information. At this time, the server apparatus may select the image capture mission from among image capture missions that are prepared in advance.

In step S103, the server apparatus receives an image captured in accordance with the image capture mission. In step S104, the server apparatus evaluates the image. In step S1105, the server apparatus determines a level of achievement based on a result of the evaluation. In a case where the level of achievement satisfies a certain criterion (YES in step S105), the server apparatus proceeds to step S106. In step S106, the server apparatus additionally distributes new contents and then the flowchart ends. In a case where the level of achievement fails to satisfy the certain criterion (NO in step S105), the server apparatus notifies the camera 100 that the level of achievement is not satisfied and then the flowchart ends.

The operations described above are basic operations of the camera 100 and the server apparatus in the "mission mode".

Subsequently, a specific form of the distribution of contents utilizing the "mission mode" will be described.

First, a description will be given of a form of utilizing the "mission mode" as a learning material. In this case, a user of the camera 100 is, for example, a child, who attempts image capturing by actually operating the camera 100 to accomplish the distributed image capture mission. By actually performing the image capturing to accomplish the image capture mission, the child can not only get used to a camera operation but also acquire various kinds of knowledge and refine sensitivity through an image capture experience.

A distribution system in this form can be implemented, for example, by a corporation that provides learning materials providing the server apparatus that manages the camera app and the image capture missions. The server apparatus manages cameras in which the camera app is installed and user information on each camera (attributes such as age, sex, and personality), and distributes an image capture mission to the camera 100 based on the user information. The server apparatus may distribute, for example, an image capture mission in a level of difficulty based on the user's age.

The camera 100 then transmits the image captured by the user using the camera 100 to the server apparatus via the communication unit 54. The server apparatus evaluates the image transmitted from the camera 100 and determines a level of achievement of the image capture mission.

Examples of the image capture mission are described below.

A mission of capturing an image of a subject having a color identical to a designated color (e.g. "take a picture of a red object")

A mission of capturing an image of a subject in which a designated language is written (e.g. "take a picture of an object on which English is written")

A mission of capturing an image of a subject that suits a content of a given sentence (e.g. "take a picture while pretending to be a cat")

A mission of capturing an image of a subject that has a form identical to that of a displayed pictogram (this mission will be described below with reference to the drawings)

The image capture mission is not limited to a mission that deals with image capturing of one still image. As described below, the image capture mission may deal with image capturing of a set of pictures including still images or moving images.

A mission of capturing images to create a story

A mission of capturing four still images to create one set of pictures

A mission of capturing several short movies in seconds to create one moving image The server apparatus includes a program that evaluates an image transmitted from the camera 100, and evaluates the image to determine a level of achievement of the image capture mission. As a result, if the server apparatus determines that the level of achievement satisfies a certain standard, the server apparatus, for example, additionally distributes an image capture mission with a higher level of difficulty as new contents. More specifically, the server apparatus preliminarily prepares and manages image capture missions with different degrees of difficulty, and can additionally distribute an image capture mission so that the level of difficulty of the mission is increased step by step from a low level of difficulty to a high level of difficulty based on a user's level of achievement.

Subsequently, examples of the image capture mission will be described with reference to the drawings. A description will be given of examples of the mission of capturing an image of a subject that has a form identical to that of a pictogram with reference to FIGS. 4A to 4C.

Figure 4A:
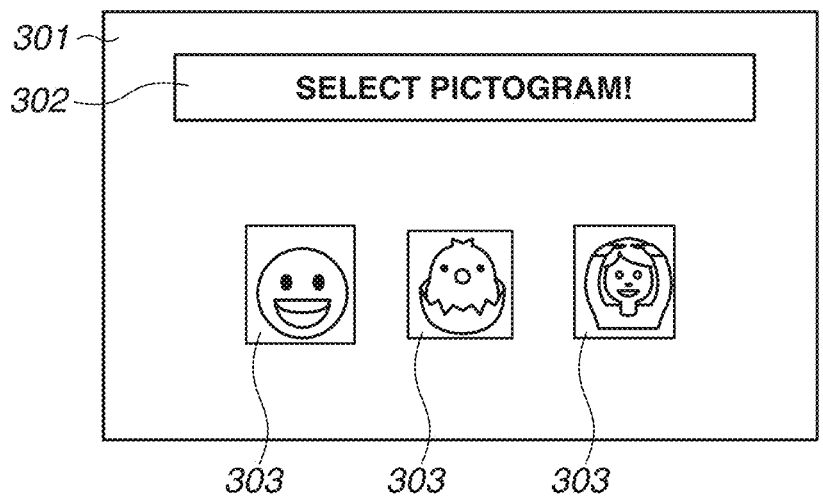
FIG. 4A is a schematic diagram illustrating an example of the mission according to the exemplary embodiment.
Figure 4B:
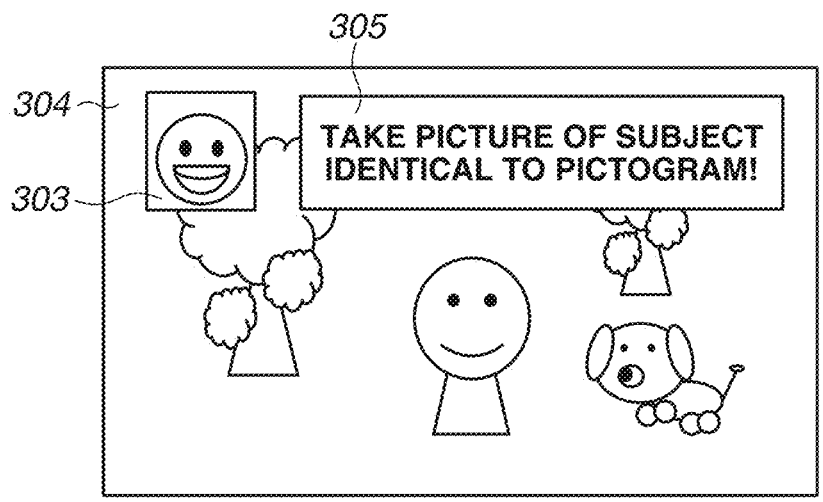
FIG. 4B is a schematic diagram illustrating the example of the mission according to the exemplary embodiment.
Figure 4C:
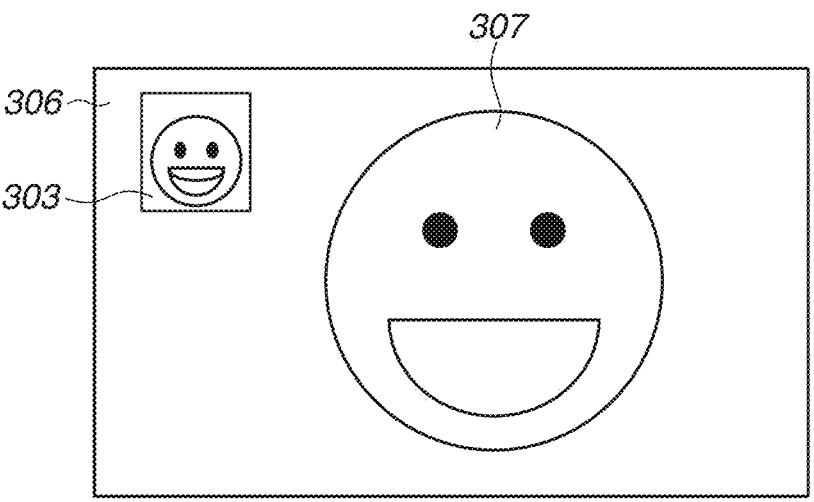
FIG. 4C is a schematic diagram illustrating the example of the mission according to the exemplary embodiment.

FIG. 4A is a screen for selecting a pictogram to be a theme for the mission. The display unit 28 of the camera 100 displays a menu screen 301, and also displays a guidance message 302 that prompts selection of a pictogram, and pictograms 303. When the user selects a pictogram by operating the operation unit 70, the screen transitions to a screen illustrated in FIG. 4B. As illustrated in FIG. 4B, the display unit 28 displays a selected pictogram 303 and a guidance message 305 that prompts a search for a subject, which are superimposed on a live view image 304. In this state, the user searches for the subject that matches the selected pictogram 303 and captures an image thereof. FIG. 4C illustrates an example of an output image.

As illustrated in FIG. 4C, the display unit 28 displays the selected pictogram 303 in a superimposed manner on a captured image 306. A subject 307 in a form similar to that of the selected pictogram 303 is expected to be displayed in the captured image 306. The server apparatus calculates a degree of similarity between the subject 307 and the selected pictogram 303 to evaluate the image.

Figure 5:
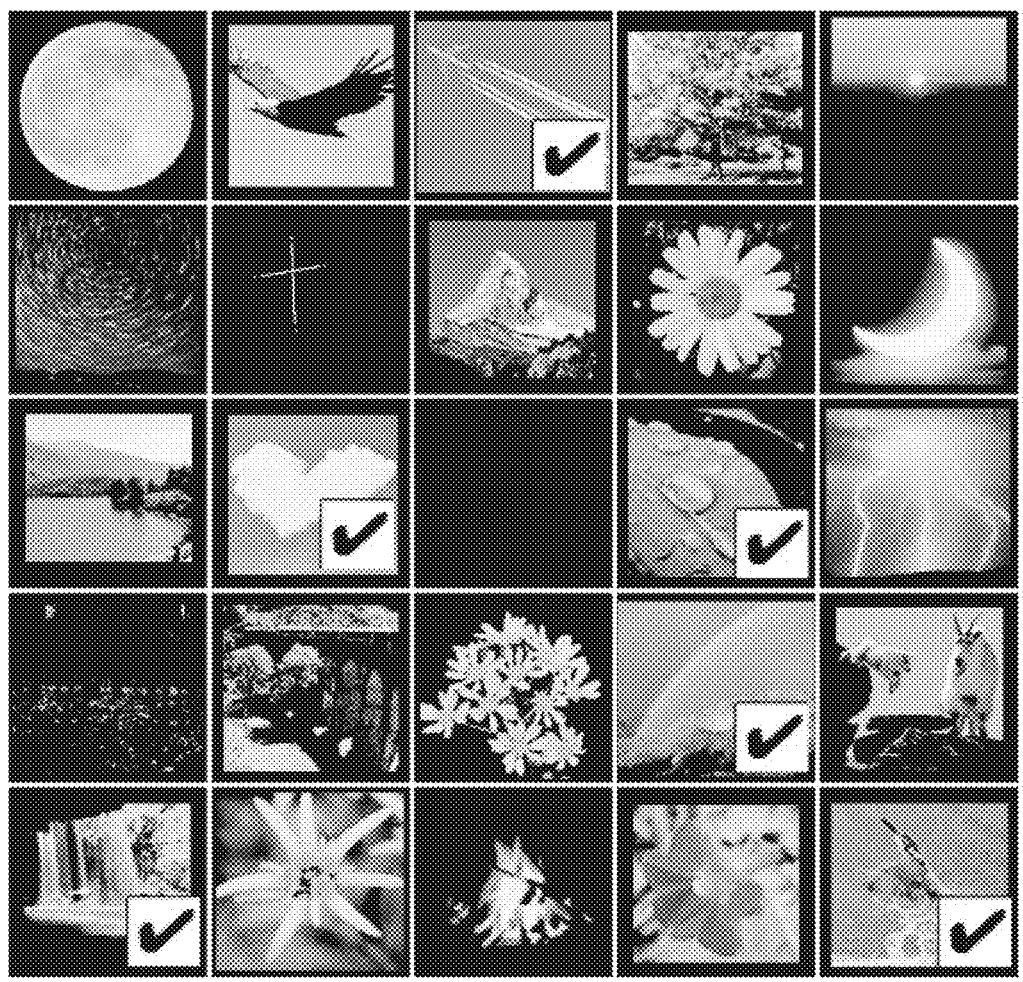
FIG. 5 is a schematic diagram illustrating another example of the mission according to the exemplary embodiment.

FIG. 5 illustrates another example of the image capture mission.

In this case, an image capture list in which various kinds of subjects are arranged in a matrix as illustrated in FIG. 5 is distributed to the camera 100 as the image capture mission. The user captures an image of a subject on the image capture list. If image capturing of subjects in any one row on the image capture list in a matrix is accomplished, the user transmits a result of the image capturing to the server apparatus.

If an image capture list on which images of all of the subjects listed on the image capture list have been captured is submitted to the server apparatus, the server apparatus determines that the image capture mission is accomplished, and distributes contents to the camera 100. Incorporating game like elements in the image capture mission in this manner can increase user's motivation for continuously utilizing the "mission mode".

The server apparatus makes an evaluation from the image received from the camera 100 in the example described above, but may make an evaluation in consideration of the following items to determine a level of achievement of the mission. In this case, the evaluation can be implemented by configuring the camera 100 to acquire information regarding a camera operation while operating in the mission mode after the camera app is started, and provide the information together with the image to the server apparatus.

The number of times the user captures an image while viewing a liquid crystal display on the rear surface The number of times the user captures an image through a viewfinder The number of times the user captures an image of a subject or captures an image in a style in conformity with contents of a mission The number of times the user has tried a mission The number of types of mission the user has tried In addition to the evaluation by the server apparatus, or in place of the evaluation by the server apparatus, the following items may be used in the evaluation.

The number of times the user has printed a captured image or the number of times the user has transmitted the captured image to an external apparatus Rating information added to a captured image published on a website Furthermore, instead of the evaluation of an image by the server apparatus, a guardian of a child may evaluate the image using a terminal and transmit the evaluation to the server apparatus. In this case, a terminal that is different from the camera 100 operated by the child and that is operated by the guardian is prepared, and the camera 100 of the child and the terminal of the guardian establish communication to communicate an image and an evaluation therebetween. Either of the terminals can be used to make the evaluation as long as the terminal that is used to make the evaluation is configured to transmit a result of the evaluation to the server apparatus. With this configuration, the camera 100 may serve as a communication tool between a parent and a child, and help the user continue learning.

The camera 100 can be configured so that some functions of the camera 100 (e.g. AF, AE, some image capture modes) are restricted and a restriction of the function is removed every time an image capture mission is accomplished to release a function. Performing control to add a function necessary for achieving an image capture mission and enable the function allows the user to learn a camera operation from a simple one step by step.

In this case, the control can be implemented by the server apparatus distributing information to release a restricted function of the camera 100 along with additional distribution of a new image capture mission in response to the accomplishment of the image capture mission.

The "mission mode" can be also utilized as a corporate advertisement.

In this case, the server apparatus distributes an image capture mission for capturing an image related to a product provided by a specific corporation. For example, a food manufacture sets a mission that prompts capturing of an image of a dish using a food product of a food manufacturer (for example, a product such as seasoning).

A mission to capture an image of a dish using a designated food product

In this case, an advertising effectiveness can be further enhanced by registering and publishing, on a website, the image related to a product provided by a specific corporation (an image of a dish) to be transmitted to the server apparatus to accept evaluations from other general users on the website.

Subsequently, another form of utilizing the "mission mode" as a corporate advertisement will be described.

In the other form, a corporation that runs a commercial facility sets an image capture mission that prompts a user at the facility to perform image capturing on a specific spot at the facility.

In a case where the camera 100 includes a GPS device, the server apparatus can determine whether the user is at the facility by acquiring positional information from the camera 100. In this form, the server apparatus can publish an image transmitted from the user (an image of the facility) on a website and accept evaluations from other users on the website to enhance the advertising effectiveness.

Furthermore, in the case of publishing the image on the website and accepting evaluations from other users on the website, if the user is a child, a restriction may be put to transmit the image to a terminal (for example, a smartphone) of a guardian once and then resister the image on the website.

In the form of utilizing the "mission mode" as a corporate advertisement, the server apparatus may be configured to distribute a coupon regarding a product of an advertiser as a reward for the accomplishment of the image capture mission as contents to be distributed from the server apparatus when the accomplishment of the image capture mission is acknowledged, instead of additionally distributing a new image capture mission.

As a timing to distribute the image capture mission from the server apparatus, distribution may be performed with a predetermined period, or may be performed at any timing designated by the user. Alternatively, the user may be able to select a mission from among mission candidates that can be added to the camera 100 in response to an instruction from the camera or a smartphone.

The description has been provided on the assumption that the image capture mission is managed by the server apparatus, but there may be a unique mission managed by a smartphone. Furthermore, a mission can be generated by the user on the smartphone or the camera 100 and can be shared with another smartphone or another camera.

FIGS. 6A to 6G are schematic diagrams each illustrating a pattern of connection between the camera 100 and the external apparatus (server apparatus).

A configuration of the entire distribution system will be described with reference to FIGS. 6A to 6G A typical system configuration will be described with reference to FIG. 6B.

Figure 6A:
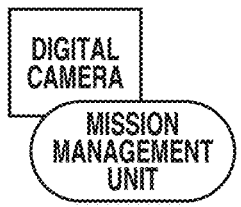
FIG. 6A is a schematic diagram illustrating a pattern of connection between the camera and an external apparatus/server apparatus according to the exemplary embodiment.
Figure 6B:
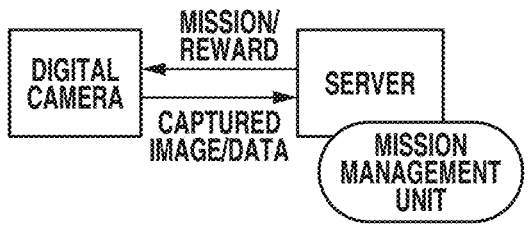
FIG. 6B is a schematic diagram illustrating a pattern of connection between the camera and the external apparatus/server apparatus according to the exemplary embodiment.

FIG. 6B illustrates a pattern in which the camera 100 and the external server apparatus directly communicate with each other. First, the server apparatus distributes a mission to the camera 100. The camera 100 adds the received mission as one of selectable missions. The user freely selects a mission from among the selectable missions of the camera 100. The user performs capturing of an image based on contents of the selected mission.

Then, the user transmits the image obtained by the image capturing to the server apparatus. The state of the camera 100 at the time of the image capturing is also added as information to the captured image. The added information can be used for determination of a level of achievement of the mission. The server apparatus makes an evaluation based on the received image and the added information to determine the level of achievement of the mission. In a case where the serer apparatus determines that the level of achievement satisfies a criterion to add a mission, the server apparatus determines whether there is any mission to be added. If there is a mission to be added, the server apparatus transmits the mission to the camera 100.

The system control unit 50 may put a functional restriction to disable a certain function on the camera 100 in advance. In this case, when a mission is added, a function regarding the mission may be enabled.

Furthermore, the transmission of a captured image may be instructed by the user of the camera 100 at a freely selected timing, or may be automatically performed with a specific period. In addition, in a pattern in which the transmission is performed via the smartphone as illustrated in FIG. 6D or the like, which will be described later, the use may instruct the digital camera 100 via the smartphone to transmit the image.

Figure 6C:
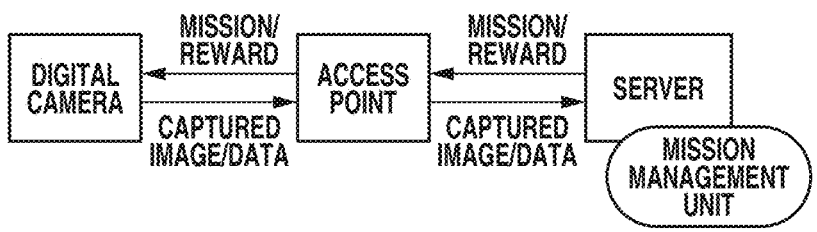
FIG. 6C is a schematic diagram illustrating a pattern of connection between the camera and the external apparatus/server apparatus according to the exemplary embodiment.
Figure 6D:
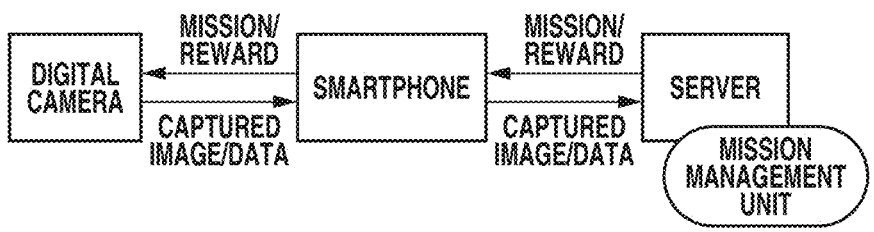
FIG. 6D is a schematic diagram illustrating a pattern of connection between the camera and the external apparatus/server apparatus according to the exemplary embodiment.
Figure 6E:
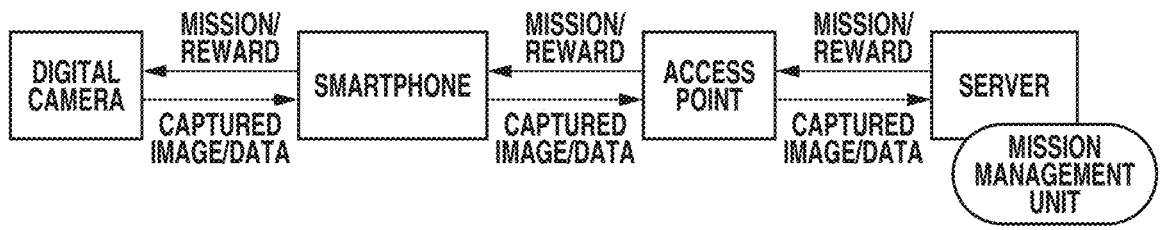
FIG. 6E is a schematic diagram illustrating a pattern of connection between the camera and the external apparatus/server apparatus according to the exemplary embodiment.

FIG. 6C illustrates an example in which the camera 100 accesses the server apparatus by way of a specific access point. FIG. 6D illustrates an example in which the camera 100 accesses the server apparatus by way of a smartphone. FIG. 6E illustrates a composite pattern of the smartphone and the access point.

Figure 6F:
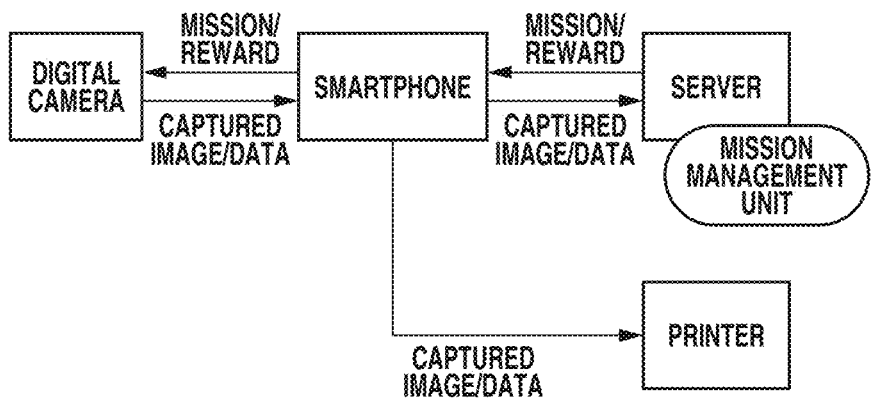
FIG. 6F is a schematic diagram illustrating a pattern of connection between the camera and the external apparatus/server apparatus according to the exemplary embodiment.

FIG. 6F illustrates an example in which the camera 100 performs printing on a printer by way of the smartphone. Printed contents or the number of times of printing may be used for determination of a level of achievement of a mission.

Figure 6G:
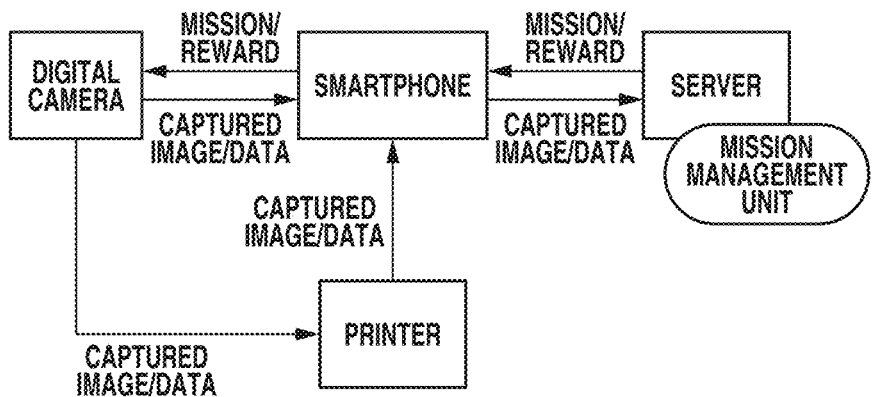
FIG. 6G is a schematic diagram illustrating a pattern of connection between the camera and the external apparatus/server apparatus according to the exemplary embodiment.

FIG. 6G illustrates an example of directly transferring an image from the camera 100 to the printer and instructing printing, and then reading a dedicated code added to the printed image with a camera of the smartphone and using the image for determination of a level of achievement of a mission.

The patterns may be combined as appropriate. For example, connections may be simultaneously established, such as in a case where the camera and the smartphone are both connected to a wireless LAN (access point) at home.

In a case where the user is a child, there may be a mechanism to put restrictions on unlimited uploading or printing of images. As an example of such mechanism, in a case where a print instruction is given from the camera 100, a notification that makes a request for permission is transmitted to a paired smartphone of a parent, and printing is performed after the parent gives permission. The printed image can be put in a dedicated case or the like and put on display.

The description has been given of the digital camera including the electronic viewfinder as an example, but the exemplary embodiment is not limited to the digital camera of this form. The digital camera may have an optical viewfinder, or a display unit on which a through-the-lens image is optically displayed and an electric view is superimposed on the through-the-lens image.

The system control unit 50 may perform the control by a single hardware component or by hardware components sharing the processes to control the entire apparatus.

While the exemplary embodiments have been described above, the scope of the present invention is not limited to the exemplary embodiments described above, and includes various modified forms in a range without departing from the gist of the present invention. Furthermore, the scope of the present invention includes a form that combines the above described exemplary embodiments as appropriate.

While the description has been given of the exemplary embodiments in which the present invention is applied to the digital camera, the present invention is not limited to the exemplary embodiments and can be applied to an electronic apparatus having an image capture function. More specifically, the present invention can be applied to a tablet personal computer (PC), a personal digital assistant (PDA), a mobile phone, or the like.

The above described exemplary embodiments may be implemented by supplying software (a program) that implements the functions of the exemplary embodiment described above to a system or an apparatus via a network or a storage medium of various types, and causing the system or the apparatus to read and execute the program. In this case, the program and the storage medium storing the program provide the above described exemplary embodiments.

The present invention is not limited to the exemplary embodiment described above, and various changes and modifications can be made without departing from the spirit and scope of the present invention. Hence, the claims are attached hereto to make the scope of the present invention available to the public.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

What is claimed is:

1. A method comprising:
   providing a mission regarding image capturing to a user terminal having an image capture function;
   evaluating an image transmitted from the user terminal in response to the mission,
   wherein the user terminal has a function to restrict AF (Auto Focus) or AE (Automatic Exposure) of the user terminal;
   providing a new mission regarding image capturing to the user terminal in a case where a level of achievement of the mission is determined to satisfy a criterion based on the evaluation;
   registering an image captured in response to the mission on a predetermined website; and
   providing contents regarding a product in a case where a level of achievement of the mission is determined to satisfy a criterion based on an evaluation received on the website, instead of additionally providing the new mission,
   wherein the mission is related to image capturing of a product provided by a corporation.

2. The method according to claim 1, further comprising:
   acquiring information regarding a user's age from the user terminal; and
   controlling distribution of the mission based on the acquired information regarding the user's age.

3. The method according to claim 2, wherein a level of difficulty of the mission increases as the user's age is higher.

4. The method according to claim 1,
   wherein in a case where a mission is to be additionally distributed, information to release a restricted function of the user terminal is distributed together.

5. The method according to claim 1, further comprising:
   acquiring information regarding a user's position from the user terminal; and
   controlling the distribution of the mission based on the information regarding the user's position.

6. The method according to claim 1, wherein the mission is to capture an image regarding a subject having a designated color.

7. The method according to claim 1, wherein the mission is to capture image regarding a subject n a form of a designated pictogram.

8. The method according to claim 1, further comprising:
   evaluating an image transmitted from the user terminal in response to the mission on another user terminal wirelessly communicating with the user terminal; and
   controlling the additional distribution of the new mission by a server apparatus having acquired the evaluation.

9. A system that performs a method of providing contents, the method comprising:
   providing a mission regarding image capturing to a user terminal having an image capture function;
   evaluating an image output from the user terminal in response to the mission,
   wherein the user terminal has a function to restrict AF (Auto Focus) or AE (Automatic Exposure) of the user terminal; and
   providing contents to the user terminal based on the evaluation, and
   the system comprising:
   a memory that stores missions in advance;
   a communication interface that provides a new mission to the user terminal in a case where a level of achievement of the mission is determined to satisfy a criterion based on the evaluations;
   register an image captured in response to the mission on a predetermined website; and
   provide contents regarding a product in a case where a level of achievement of the mission is determined to satisfy a criterion based on an evaluation received on the website, instead of additionally providing the new mission,
   wherein the mission is related to image capturing of a product provided by a corporation.

* * * * *